Jan. 10, 1956     K. BESOYAN     2,730,196

VEHICLE EMERGENCY BRAKE

Filed July 21, 1950     2 Sheets-Sheet 1

INVENTOR
KIRK BESOYAN
BY
ATTORNEYS

Jan. 10, 1956  K. BESOYAN  2,730,196
VEHICLE EMERGENCY BRAKE
Filed July 21, 1950  2 Sheets-Sheet 2
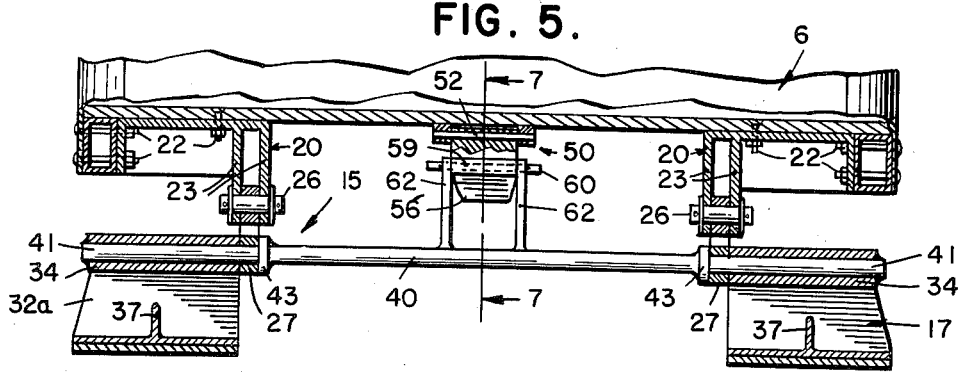
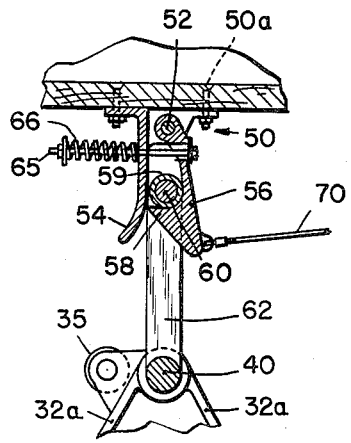
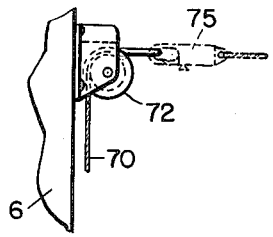
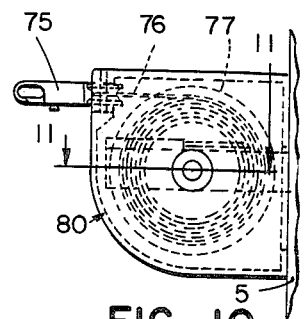
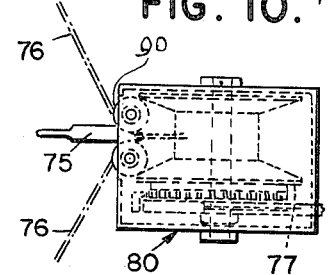
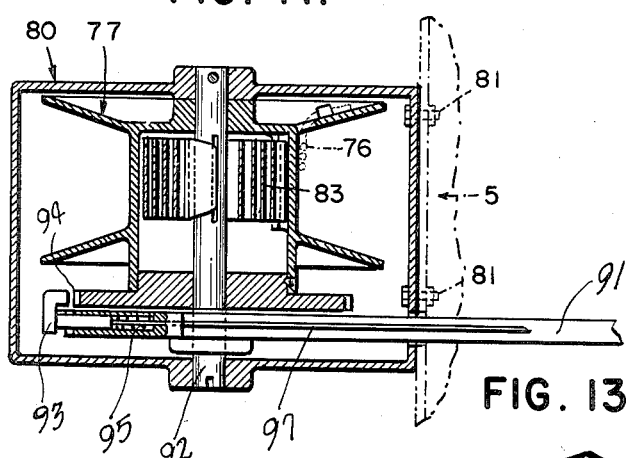
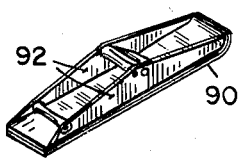
INVENTOR
KIRK BESOYAN
BY
ATTORNEYS

United States Patent Office 2,730,196
Patented Jan. 10, 1956

2,730,196

VEHICLE EMERGENCY BRAKE

Kirk Besoyan, Los Angeles, Calif., assignor, by direct and mesne assignments, to Truck Safety Engineering Corp., Los Angeles, Calif., a corporation of California Application July 21, 1950, Serial No. 175,066

1 Claim. (Cl. 188—4)

This invention has to do with emergency braking devices for vehicles and relates more particularly to the provision of emergency braking means for heavy trucks and trailers.

A long existing difficulty in the handling of heavy trucks and trailers has been the fact that in cases of braking failures, or when driving on icy roads, the truck or truck and trailer get out of control, causing considerable property damage and loss of life.

It is an object of my invention to provide an emergency braking device for such vehicles, which remains out of use during normal operation of the vehicle but, in any emergency, it may be easily and instantly rendered effective.

Another object is to provide, in such a device, an emergency braking shoe which, when performing its emergency service, does not place any stress upon the links or other means used to support it when it is not in use.

Other objects will appear as the following description of a presently preferred embodiment of the invention proceeds, for the purposes of which description I shall refer to the accompanying drawings, wherein:

Fig. 5 is an enlarged sectional view taken on line 5—5 of Fig. 1;

Fig. 7 is an enlarged section taken on line 7—7 of Fig. 5;

Fig. 8 is a side elevation of a portion of the braking apparatus operating mechanism;

Fig. 9 is a view of another part of the operating mechanism;

Fig. 10 is a top plan view of Fig. 9;

Fig. 11 is an enlarged section taken on line 11—11 of Fig. 9;

Fig. 13 is a perspective view of a shoe for use with a single wheel.

Figure 1:
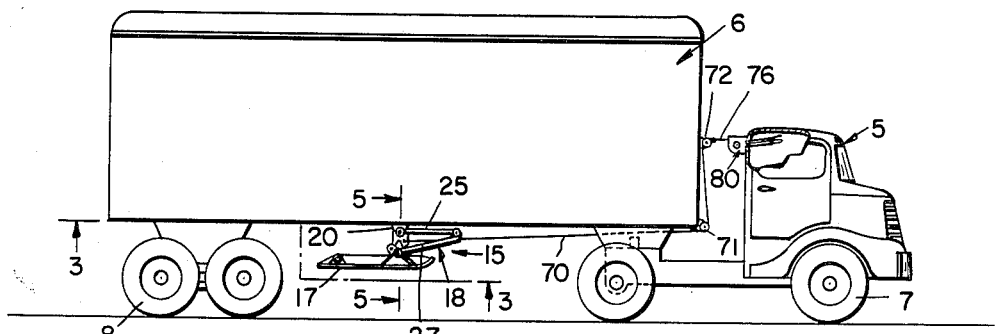
Fig. 1 is a side elevation of a truck and trailer showing my emergency braking device mounted upon the trailer.

Referring now to the drawings, the numeral 5 denotes a vehicle, such as a truck, having a trailer 6 attached to it in the customary manner. The trailer has front wheels 7 and rear wheel trucks 8, each of which carries four double wheels carrying inflated tires 9 and 10, all of conventional construction. The truck and trailer assembly also, of course, has a conventional braking system for normal braking, but which it is not necessary to show in the drawings since my invention only comes into use in the event of failure or inadequacy of the usual braking system.

Figure 3:
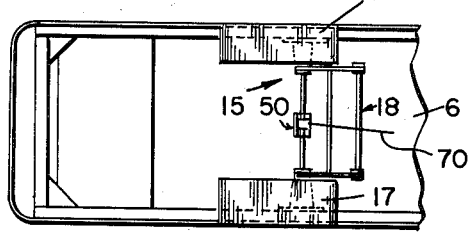
Fig. 3 is a bottom plan view taken on line 3—3 of Fig. 1.

My emergency braking unit is generally denoted by the numeral 15 and comprises a pair of drag shoes 17 pivotally suspended from the bottom of the trailer by a link assembly 18, in the following manner:

A pair of brackets 20 are secured to the bottom of the trailer as by bolts 22, the depending end of each bracket having bifurcations 23 between which the upper end of the upper link 25 is pivoted by pintle 26. The other end of the link 25 is pivoted to the bifurcated end of the lower link 27 by pintle 28. A like pair of links are mounted in this manner on the other side of the trailer bottom (Fig. 3), and the links 25 are connected together by a cross bar 30.

A particular feature of novelty in my emergency braking unit resides in the construction and arrangement of the drag shoes, which are such that, when placed in use in an emergency, their drag does not exert any stress upon the linkage above described, by means of which they are normally held on the vehicle when not in use and by means of which they are controlled in their movement into initial engagement with the ground surface after being released for emergency use.

Each of the shoes 17 has a cross member 32 between its ends, comprised of angularly disposed walls 32a carrying a sleeve 34 and a roller 35. The shoe has a medial longitudinal rib 37 which fits between the tires of a wheel when the device is in use to prevent lateral escape from the wheel. The rear end of each shoe has a forwardly inclining ramp wall 38 for the purpose to be described, and at the upper end of said wall a pair of cross-rollers 38a are disposed, the latter rollers having end trunnions 38b bearing at one end in flanges 38c formed integral with or suitably attached to the base of the shoe and at their other ends in rib 37. The spacing and height of said rollers above the base of the shoe are such that when the tire of a wheel rests upon them, the intervening peripheral portion of the tire periphery is out of contact with the shoe, so that the wheel is free to rotate relative to the shoe in a manner to tend to push the shoe forwardly instead of riding off the shoe—that is, the rollers 38a and 35 are spaced apart longitudinally of the shoe a distance greater than the radius of the wheel while the height of the rollers above the base of the shoe is such as to support the wheel periphery out of contact with said base. Preferably, the bottom surface of each shoe is covered by means of a friction surfacing material such as rubber 39.

Extending between the shoes 17, I provide a rod 40 whose end portions 41 rotatably fit in the respective sleeves 34, the rod having annular flanges 43 adjacent its ends to insure proper spacing of the shoes.

For releasably retaining the above-described shoe and link assembly in inoperative position (Fig. 1), I provide a bracket 50 secured to the bottom of the trailer as by bolts 50a. This bracket has a cross-pin 52 and has a depending portion 54. A latch dog 56 is pivoted at its top end to cross-pin 52 and has a relatively wide bottom end portion 58, providing an upwardly facing shoulder which engages under a rotatable sleeve 59, through which extends a cross-pin 60. The latter pin extends through holes in the upper ends of uprights 62 preferably formed integral with the bar 40 intermediate the ends of the latter. The latch dog 56 is urged toward the portion 54 by means of a bolt 65 which is urged to the left in Fig. 7 by compression spring 66.

During normal operation of the truck and trailer the emergency braking unit is retained in its upper inoperative or idle position (Fig. 1), by means of latch dog 56, which may be released by a cable 70 which extends over sheaves 71, 72 on the trailer body. Attached to the truck cab by bolts 81 there is a sheave housing 80 in which a sheave 77 is mounted. This sheave is loaded by a coil spring 83 to rotate clockwise. A cable 76 is wound about the sheave 77 and has a snap clasp 75 on its free end, which clasp is fastened to the free end of cable 70. Thus, the sheave keeps the cable 70 taut but permits it to move axially when turning corners with the vehicle, although the energy of sheave spring 83 is not sufficient to compress spring 66. Rollers 90 (Fig. 10) are provided on housing 80 to relieve cable 76 of any undue friction during turning corners with the vehicle. A sheave operating lever 91, pivoted about sheave spindle 92, projects into the cab 5 for manual operation, and has on its outer end a pawl 93 engageable with ratchet teeth 94 on the sheave. The pawl is normally held out of engagement with the teeth by a spring 95 but may be brought into engagement with said teeth by a pull rod 97 operatively connected to an auxiliary lever 98 pivoted on the inner end of lever 91.

Figure 2:
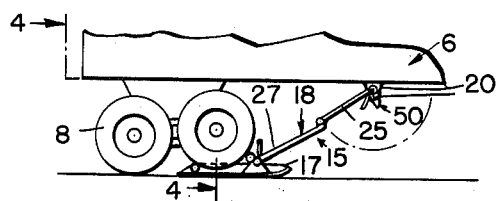
Fig. 2 is a fragmentary side elevation illustrating my device in braking position.
Figure 4:
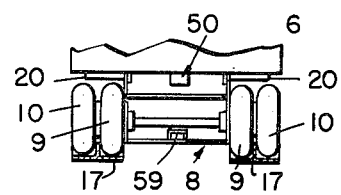
Fig. 4 is an end view taken on line 4—4 of Fig. 2.

If any emergency condition arises requiring the bringing into use of the emergency braking unit, it is only necessary for the operator to pull on the cable 70 by operating the lever 91 to rotate sheave 77, thus releasing the dog 56 from engagement with the sleeve 59. This permits the shoes to drop down into engagement with the ground ahead of the rear wheel truck 8, the links 25, 27 controlling this movement. Further movement of the truck and trailer causes the forward wheels of the truck 8 to ride up on the shoes, riding up the inclined wall 38 of the respective shoes, then dropping into the saddle between the rollers 35, 38a. Since the shoes present a friction surface to the ground and are attached to the pintle, further movement of the trailer is effectively resisted. Inasmuch as the tires rest upon the anti-friction rollers 35, 38a, the rotational momentum of the wheels will be spent by rotating the rollers instead of tending to throw the shoe from beneath the tires. Also, no stress is placed upon the links 25, 27—in fact, the wheels tend to push the shoes forward, relieving the links of all stress, which result is augmented by the cross portion 32 being higher than rear cross portion. The shoes also prevent side sway of the vehicle such as would be the case if the trailer were traveling upon an icy road surface. The purpose of attaching the end of the cable to the end of the wire carried by the spring loaded sheave 77 is to permit the drop of the shoes from the position of Fig. 1 to the position of Fig. 2.

After the emergency has been met, it is only necessary to back the wheels off the shoes and lift the shoes upwardly, engaging the sleeve 59 with the latch dog 56.

Figure 12:
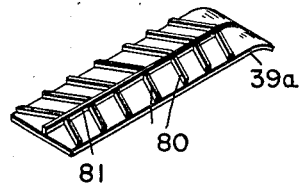
Fig. 12 is a perspective view of a modified form of braking surface for the shoe shown in Fig. 6.
Figure 6:
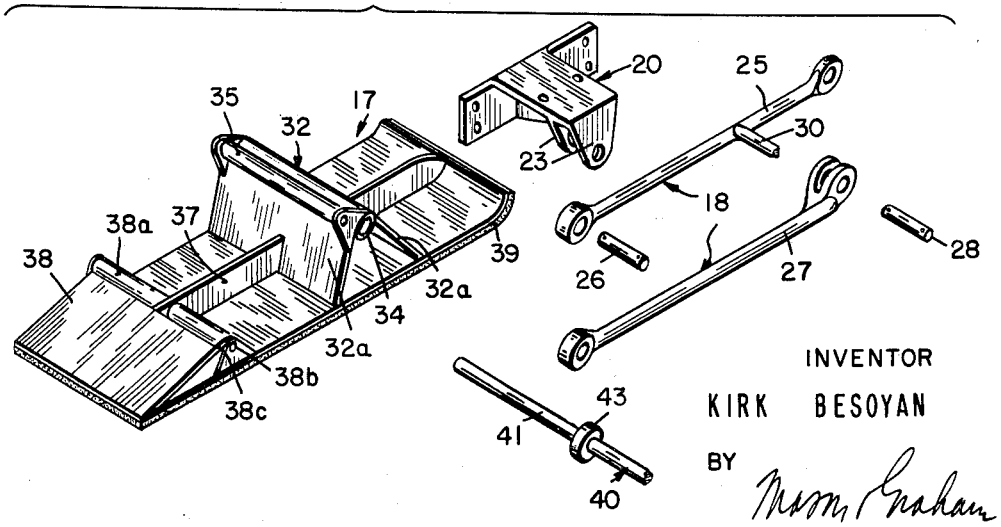
Fig. 6 is a perspective view of the parts shown disassembled.

In Fig. 12 I show a variational form of friction surface for the shoes, the friction surface plate 39a here shown being provided with diagonally transverse ribs 80 and a longitudinal medial rib 81.

In Fig. 13 I show a modified form of shoes 90 which is adapted for a single wheel arrangement, it being the same as before described except that it is narrower—being the width of one wheel tire—and it does not have the medial rib 37 before described. Also, the shoe 90 has side walls 92 which positively prevent side escape of the shoe from beneath a tire. In the case of the shoes 17 before described, the medial longitudinal rib 37, which engages between the tires, prevents this side escape.

I claim:

In an emergency braking device for a vehicle wheel, a drag shoe comprising a body having a flat bottom ground-engaging surface inclining forwardly at its front end, a pair of coaxial longitudinally spaced transversely disposed rear rollers rotatably carried by the top portion of the body adjacent its rear end, a forward roller rotatably carried by the top portion of the body in parallel relation to the rear rollers, said forward roller being spaced from the rear rollers a distance greater than the radius of said wheel and being disposed about an axis above the plane of the longitudinal axis of said rear rollers, and a vertical rib extending upwardly above the top surface of and longitudinally of the body between the rear rollers; said forward roller being higher than said rib; the rear top surface of said body inclining upwardly from its rear end to said rear rollers.

References Cited in the file of this patent

UNITED STATES PATENTS

| | | |
|---|---|---|
| 952,851 | Wagner | Mar. 22, 1910 |
| 1,401,350 | Monahan | Dec. 27, 1921 |
| 1,482,538 | Arnold | Feb. 5, 1924 |
| 2,143,553 | Hamaguchi | Jan. 10, 1939 |
| 2,344,148 | Jackson | Mar. 14, 1944 |
| 2,513,691 | Tower | July 4, 1950 |

FOREIGN PATENTS

| | | |
|---|---|---|
| 322,836 | France | Mar. 13, 1903 |
| 472,507 | Germany | Feb. 7, 1929 |
| 646,052 | Germany | June 7, 1937 |
| 280,984 | Great Britain | Dec. 1, 1927 |
| 318,398 | Great Britain | Sept. 5, 1929 |